June 30, 1959     A. A. STONEHILL     2,892,539
LIGATURE AND SUTURE PACKAGE
Filed July 5, 1957
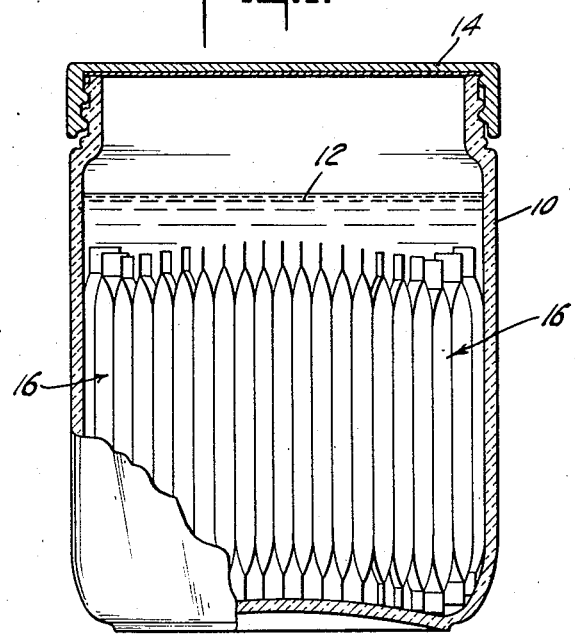
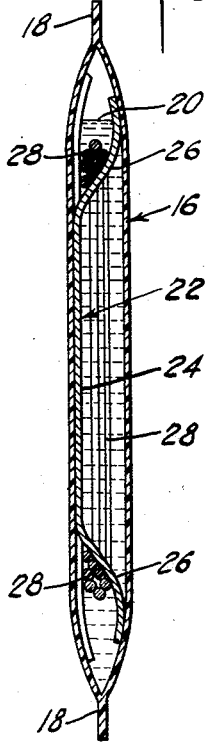
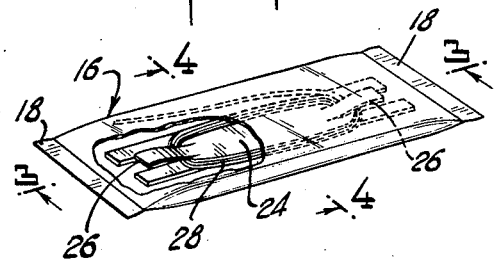
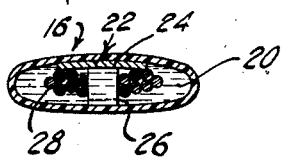
INVENTOR
ALBERT A. STONEHILL
BY
Robert W. Kell
ATTORNEY

2,892,539
LIGATURE AND SUTURE PACKAGE

Albert A. Stonehill, Plainfield, N.J., assignor to Ethicon, Inc., a corporation of New Jersey Application July 5, 1957, Serial No. 670,267

8 Claims. (Cl. 206—63.3)

This invention relates to the packaging of sutures and ligatures in sealed plastic envelopes and more particularly relates to a package in which a plurality of sealed plastic envelopes containing sutures or ligatures and an aqueous alcoholic tubing fluid are immersed in an aqueous alcoholic sterilizing solution containing formaldehyde which is actively sporicidal.

For convenience, reference hereinafter may be made only to sutures or to ligatures; however, it will be understood that such references apply equally to both sutures and ligatures and that no intention to exclude one or the other should be inferred.

It has been the practice in recent years to package a plurality of hermetically sealed glass suture tubes containing sutures or ligatures and an aqueous alcoholic tubing fluid in a hermetically sealed container in which the tubes are immersed in an aqueous alcoholic sterilizing liquid containing formaldehyde, whereby the suture tubes are continuously under the effective influence of the sterilizing liquid. A package for hermetically sealed suture tubes of this nature is described in U.S. Patent No. 2,470,494. Sterile sutures and ligatures have also been packaged in a hermetically sealed jar or a can which contains a sterilizing liquid and an envelope open to the flow of and immersed in the sterilizing liquid with a coiled suture in the envelope and in contact with the sterilizing liquid. It has also been contemplated to package sterile sutures and ligatures in a receptacle, such as a glass jar, containing a sterilizing solution and a hermetically sealed flexible suture container immersed in the sterilizing solution with a suture and a second sterilizing solution within the flexible container, the container being resistant to osmotic action by the sterilizing solution. The first sterilizing solution consisted of an aqueous alcoholic solution containing a germicidal agent such as potassium mercuric iodide, phenol mercuric acetate or nitrate, and the second solution consisted of an aqueous alcoholic solution. The hermetically sealed container for the suture or ligature was composed of rubber hydrochloride or similar material.

In employing the prior practices, several serious disadvantages are encountered that have long been recognized and studied. At present, some manufacturers, as indicated above, supply their sutures in sealed glass tubes. When it is desired to use a glass packaged suture, the attendant in the operating room must break the glass in order to reach the suture. In doing so, it happens on occasions that the attendant is cut by the glass, and the suture may be contaminated by blood from the cut or may itself be damaged by cutting; also, spicules of glass may adhere to the suture and be carried into the body opening. When these things occur, the attendant is temporarily incapacitated and the suture cannot be used.

Aside from these disadvantages, however, glass is excellently suited for protecting sutures and ligatures, and prior to this invention, it has not been found possible to match the good qualities of glass with plastic materials. Plastics, as a class of materials, are found to involve serious disadvantages. The criteria involved in assessing the utility of plastics are set forth hereinafter, and at this point in the discussion it is sufficient to state that prior to this invention it is believed that no manufacturer has succeeded in adapting any plastic to suture or ligature packaging without sacrificing at least one of the important considerations of such packaging. One of the most serious obstacles to the use of plastics is their permeability with respect to the tubing fluid in which the sutures are disposed in the envelope and with respect to the sterilizing liquid, often referred to as a storage solution, in which the envelopes are immersed. In the case of catgut sutures or ligatures, tubing fluids and sterilizing solutions are essential, and some comments concerning them may be desirable.

The purpose of sterilizing solutions for suture tubes and packages is to make sutures available to operating room personnel, the container of which is sterile and can be placed on the instrument table and handled by the instrument nurse without undue precautions.

Since unused suture tubes and packages will be returned to the sterilizing solution, this solution must be capable of resterilizing the container within a reasonable period of time.

To meet all of the conditions that may be encountered in an operating room, the storage solution must be lethal to bacteria, both in the vegetative and spore form, and to molds and yeasts. Furthermore, the solution must sterilize in the vapor phase since infrequently is the top and rim of the sterilizing solution container actually in contact with the solution.

If sutures are packaged in material other than glass, the sterilizing solution must either not penetrate the suture container, or if it does, it must be non-toxic and exert no unfavorable action on the suture material.

There are many good antiseptics available for special purposes. Very few, however, can meet the exacting requirements of a sterilizing or storage solution for suture tubes. Literally hundreds of compounds and mixtures have been studied as possible sterilizing agents for storage solutions. To date, only formaldehyde in suitable concentrations fulfills the criteria for antibacterial activity. No other suitable agent is now known for surely guarding against the danger of infection by tetanus spores at the time sutures or ligatures are applied.

Accordingly, at present it is extremely desirable to employ formaldehyde as the envelope storage medium. However, in so doing and where plastic envelopes are employed, a problem hitherto insurmountable is encountered. This problem involves the facts that sutures are seriously deleteriously affected when contacted by formaldehyde and that prior to this invention, it has not been possible to prevent formaldehyde from reaching the sutures by passage through the walls of the plastic envelopes.

When a catgut suture or ligature is contacted by formaldehyde for any substantial time period, it is weakened and hardened to a point where it cannot be used. A suture made from other materials absorbs formaldehyde and is thus made strongly irritating to body tissue. Therefore, any envelope which fails to resist permeation by formaldehyde is unsuitable. Many known plastic materials fail in this regard; for example, it has not yet been found possible to use materials such as cellophane, Mylar, Saran, Penton 115, polyethylene, Nylon, polystyrene and many other similar materials.

A further troublesome problem arises with respect to the tubing fluid, which is that fluid within the envelope in direct contact with the suture. Where catgut is employed, means must be provided for maintaining its water content at a suitable level; otherwise, it loses strength. For this purpose an alcohol-water mixture, which is somewhat critical proportionwise as between the alcohol and water, is employed, which mixture is known as a tubing fluid. Passage of alcohol or water through the envelope walls upsets the equilibrium of the tubing fluid-catgut system, leading to deterioration of the catgut, Therefore, it is essential that this aspect of the problem be met satisfactorily.

Very remarkably, according to this invention, it has been discovered that formaldehyde may be employed as the sterilizing fluid and an alcohol-water mixture may be employed as the tubing fluid, and all of the other disadvantages heretofore encountered are overcome if the plastic suture envelopes are fabricated to contain a substantial amount of combined fluorine. It has been discovered that the presence of fluorine in a polymer molecule imparts all characteristics that are essential in a plastic suture or ligature envelope. Especially suitable materials, in the sense that suture or ligature envelopes fabricated therefrom are stable to the effects of heat, light and other radiations encountered in storage in hospitals, are resistant to solvents, soften at reasonably low temperatures to permit easy sealing, are, for all practical purposes, impermeable to alcohol, water and formaldehyde, are plastic materials containing fluorine in the range of about 20–76 percent by weight of the polymer molecule. At the present time, preferred materials are those containing about 45–76 percent fluorine by weight. Exemplary of such preferred materials are polymerized trifluorochloro ethylenes and copolymers of trifluorochloro ethylene with various other fluorine containing monomers, for example, especially vinylidene fluoride. These particular materials are more fully described hereinafter. For convenience in describing the invention, polymeric trifluorochloro ethylene and copolymers of trifluorochloro ethylene with vinylidene fluoride are referred to throughout the ensuing description of the invention; however, it will be understood that the invention is not thus limited and that many other fluorine containing materials are suitable and are encompassed within the invention.

In the following description of the ligature and suture package of the invention, reference will be made to the accompanying drawing forming a part hereof and in which:

Figure 1 shows a side elevation of an assembled sealed container containing a plurality of hermetically sealed plastic envelopes and a sterilizing solution with part of the container broken away;

Figure 2 is a view in perspective of a single hermetically sealed suture or ligature envelope partly broken away showing a suture and the reel on which it is wound surrounded by a preserving solution or tubing fluid;

Figure 3 is a longitudinal sectional view of the envelope shown in Figure 2 taken on the line 3—3; and, Figure 4 is a cross-sectional view of the envelope of Figure 2 taken on the line 4—4.

Referring to the drawings, Figure 1 shows an assembled container unit having therein a sterilizing fluid 12 and a hermetically sealing screw cap 14. Container 10 may be of any suitable materials, including metal and plastics; however, preferably, it is of glass. Numeral 16 denotes hermetically sealed envelopes fabricated as hereinafter described, within container 10 and immersed in the sterilizing solution 12.

In Figures 2, 3 and 4, numeral 18 denotes portions of plastic envelope 16 forming a hermetic seal, the seal being effected as by the application of heat and pressure along the narrow sides of the envelope. Numeral 20 denotes a tubing fluid in which the suture or ligature is packaged when the envelope is sealed. Numeral 22 denotes generally a reel having a body portion 24 and flanges 26. Reel 22 may be formed of any material which is inert with respect to the other components of the envelope, the tubing fluid and the suture or ligature. Finally, numeral 28 denotes a suture wound upon reel 22.

The plastic envelopes 16 are made by heat sealing the edges of a sheet or tube of, for example, polymerized trifluorochloro ethylene or a copolymer obtained by the copolymerization of trifluorochloro ethylene with between 0.5 and 6 mol percent of vinylidene fluoride.

Methods of obtaining the homopolymer of trifluorochloro ethylene are well known; its preparation is referred to in U.S. Patent No. 2,738,343 and many references to its preparation may be found in Vinyl and Related Polymers by Schildknecht, copyright 1952 by John Wiley and Sons, Inc. The method of obtaining the copolymer is also described in U.S. Patent No. 2,738,343. Suitable polymers and copolymers have a no strength temperature value above about 210° C., and, preferably, not higher than about 350° C. The no strength temperature of these and similar materials is determined according to the method given in the above-identified patent on page 2, column 2, beginning at line 18.

In order for a plastic envelope for ligatures or sutures to be satisfactory, it is necessary that sterility of the suture or ligature be maintained and that, upon storage of the envelope, the fluid content of the envelope be retained for at least three years. The fluid content 20 of the plastic envelopes 16 is an aqueous alcoholic solution, preferably containing about 90 percent isopropyl alcohol. A catgut suture or ligature stored in such a solution has a moisture content of about 20 percent which is necessary in order that it retain its strength and have the desired pliability and knot tieing characteristics. As indicated hereinbefore, there should be no loss of either isopropyl alcohol or water from the solution through the walls of the plastic envelope 16. Therefore, the plastic used in fabricating the plastic envelope should not exhibit a selective permeability for water or alcohol since any change in the ratio of the water and alcohol adversely affects the catgut suture or ligature.

Sterilizing solution 12 consists of 70 to 90 percent alcohol, preferably isopropyl alcohol, 29 to 9 percent water and about one percent formaldehyde. Those skilled in the art will understand that mentioned ranges are not critical but are desirable in view of the objects to be accomplished. As indicated above, it is essential that there be no transfer of the formaldehyde of the sterilizing solution through the walls of the envelope 16 into the tubing fluid 20. The presence of as little as 0.05 percent by weight of formaldehyde in the fluid in the plastic envelope has a deleterious effect on the physical and chemical properties of catgut immersed in the fluid.

The plastic of envelope 16 must be chemically stable and inert, especially where carbon steel needles are attached to the catgut sutures and ligatures in order that there be no corrosion. The plastic used in fabricating the plastic envelope 16 should not contain plasticizers which are leached out by alcohol, water or formaldehyde since this results in embrittlement of such plastics. The plastic used in fabricating envelope 16 should also be resistant to irradiation by either beta or gamma rays of a dosage level required in sterilizing catgut sutures and ligatures. Finally, the plastic used in fabricating the envelope should be heat sealable, and the seal should not be damaged by contact with the fluid in the plastic envelope or the sterilizing liquid in which the plastic envelope is immersed.

Fluorine containing polymers and especially polymerized trifluorochloro ethylene and copolymers of trifluorochloro ethylene and vinylidene fluoride, as described above, have all the properties necessary for a plastic suitable for use in fabricating the plastic envelopes 16. Heat sealed plastic envelopes fabricated from a 5 mil thick film of these plastics have been found to have the ability to retain the tubing fluid inside the envelopes and to prevent any formaldehyde present in the sterilizing liquid from passing through and into an aqueous alcoholic solution present in the envelopes.

In order to determine the effect of the presence of formaldehyde on catgut sutures or ligatures, catgut strands, having a diameter of 26.5 to 30 mils and a length of five feet, were sealed in individual glass tubes which contained 90 percent aqueous isopropyl alcohol solution. Eight tubes contained no formaldehyde, and additional lots of eight tubes each contained 10, 30, 50, 100, 200, 300 and 500 parts per mm. of formaldehyde. The tubes were stored for four weeks at 100 to 105° F., and at the end of the storage period the tubes were opened and the catgut was analyzed for formaldehyde and tested for tensile strength. All catgut strands stored in tubes containing formaldehyde had at least a five percent loss in tensile strength and, in all instances, the catgut had absorbed at least 60 percent of the formaldehyde originally present in the 90 percent aqueous isopropyl alcohol solution. The loss in tensile strength was increased markedly for the catgut stored in 90 percent aqueous isopropyl alcohol solution containing over 100 parts per mm. of formaldehyde.

In order to determine the permeability of various plastics to formaldehyde, five foot lengths of catgut sutures having a diameter of 26.5 to 30 mils were hermetically sealed in plastic envelopes fabricated of plastic sheets having a thickness of five mils. Each plastic envelope contained a catgut suture and one and one-half cubic centimeters of 90 percent aqueous isopropyl alcoholic solution. Ten plastic envelopes were composed of each of the following plastics: polymerized trifluoromonochloro ethylene, having a no strength temperature above 210° C., a copolymer of trifluoromonochloro ethylene and 4 mol percent of vinylidene fluoride, having a no strength temperature above 210° C., Mylar, rubber hydrochloride, non-plasticized polyvinyl chloride, polystyrene and Nylon. All the hermetically sealed plastic envelopes were immersed in a sterilizing liquid containing one percent formaldehyde, 20 percent isopropyl alcohol and 29 percent water. The sterilizing solution and the plastic envelopes immersed therein were stored for four weeks at 100 to 105° F. The plastic envelopes were then removed from the sterilizing solution, and the catgut sutures were removed from the envelopes and analyzed for formaldehyde and tested for tensile strength. The sutures immersed in polymerized trifluoromonochloro ethylene and copolymerized trifluoromonochloro ethylene and vinylidene fluoride had not lost tensile strength, and analysis did not show formaldehyde to be present in the catgut sutures. All other sutures showed a loss of at least five percent strength, and analysis established that the catgut sutures contained substantial amounts of formaldehyde.

In general, suitable wall thickness for the suture envelope, desirable factor being considered, is found to be from about 3 mils to about 10 mils. Depending upon the materials employed and desired storage time, however, walls may be thinner or thicker.

It is desired to emphasize that the present discovery and invention embraces polymeric materials in general wherein there is contained an amount of fluorine chemically combined effective to provide the impermeable wall structure herein described as being desirable. It is not intended to restrict the invention to fluorine materials which in themselves supply each and every desirable attribute of a material suitable for suture packaging since it is well known that various modifications and characteristics of polymeric materials can be supplied by simple compounding of modifying agents therewith. Fluorine containing polymers, in general, are suitable providing that they are sufficiently chemically stable under the conditions of fabrication and storage of hermetically sealed suture envelopes, that they do not break down and become incapable of functioning in the manner hereindescribed.

Polymers of materials such as trifluoroethylene, tetrafluoroethylene, difluorochloro ethylene, similar derivatives of propylene, copolymers of these materials with various other monomers such as ethylene, vinyl chloride, vinylidene chloride, vinyl and vinylidene fluoride, are examples of polymers which also may be employed in forming the envelopes described herein. Additionally, mixtures of the above-mentioned polymers are suitable for use in the invention, and still other polymers may be employed with them in admixture.

Those skilled in the art are aware that the art of fluorine polymer chemistry is still highly undeveloped and that as it does develop in the future new materials will become available, not now known, which will be suitable for use in the present invention; this invention envisions the use of any such new suitable materials.

While the satisfactory packaging of sutures and ligatures has been described herein as the objective, it will be understood that the invention extends to the packaging of other materials requiring similar treatment.

It will be apparent to those skilled in the art that the principal objects of the invention have been accomplished and that numerous and various changes and modifications may be made in the embodiments of the invention herein described and that the invention is capable of use and has advantages not specifically described herein; it will, therefore, be appreciated that the hereinmade disclosures are to be construed in the nature of illustration only and that the invention is to be limited or delineated only by the appended claims.

What is claimed is:

1. A surgical package for sutures, ligatures and the like comprising an outer hermetically sealed receptacle, a sterilizing fluid in said receptacle, said fluid comprising about 70–90 percent alcohol, about 10 percent water and about 1 percent formaldehyde; at least one hermetically sealed envelope immersed in said fluid and containing the above-mentioned surgical material therein, said envelope being formed from a polymeric trifluorochloro ethylene having a no strength temperature value above about 210° C. and containing an approximately 90 percent alcohol solution.

2. A package as claimed in claim 1 wherein said packaged material is of catgut.

3. A package as claimed in claim 1 wherein said envelope is formed from a copolymeric material prepared by reacting trifluorochloro ethylene and from about 0.4 to about 6 mol percent vinylidene fluoride until a polymer is obtained having a no strength temperature value above about 210° C.

4. A package as claimed in claim 3 wherein said packaged material is of catgut.

5. In a package of surgical materials wherein said materials are enclosed in a sealed container and are stored in a formaldehyde solution, the improvement that comprises a container formed from a polymeric material having about 20–76% by weight of combined fluorine.

6. The improvement as claimed in claim 5 wherein the packaged materials are of catgut and the said container contains an approximately 90 percent alcohol solution.

7. In a package of surgical materials wherein said materials are enclosed in a sealed container and are stored in a formaldehyde solution, the improvement that comprises a container formed from a polytrifluorochloro ethylene polymer having a no strength temperature value above about 210° C.

8. In a package of surgical materials wherein said materials are enclosed in a sealed container and are stored in a formaldehyde solution, the improvement that comprises a container formed from a copolymer of trifluorochloro ethylene and vinylidene fluoride, said copolymer having a no strength temperature value above about 210° C.

References Cited in the file of this patent

UNITED STATES PATENTS

| | | |
|---|---|---|
| 1,914,836 | Randall | June 20, 1933 |
| 2,142,707 | Austin | Jan. 3, 1939 |
| 2,604,751 | Haley | July 29, 1952 |

FOREIGN PATENTS

| | | |
|---|---|---|
| 1,079,798 | France | May 26, 1954 |
| 747,162 | Great Britain | Mar. 28, 1956 |